April 29, 1924.
P. ROOTS
DITCH GATE
Filed Sept. 6, 1921
1,492,482
3 Sheets-Sheet 1
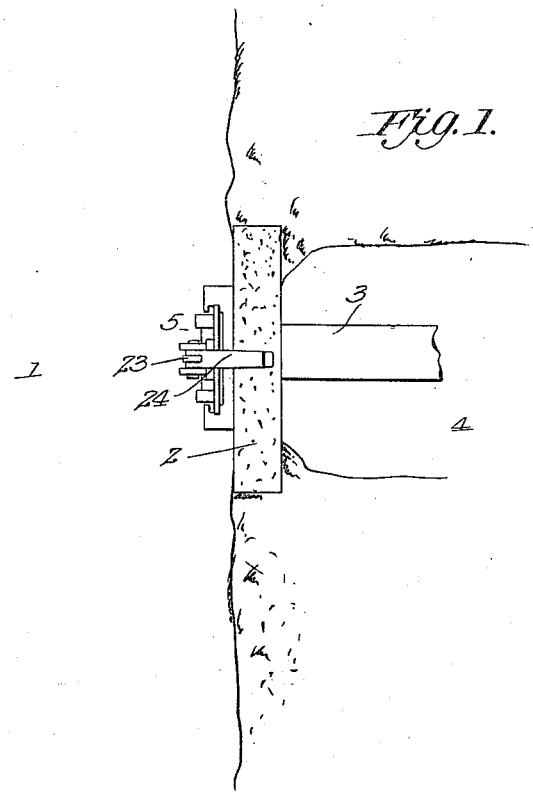
Fig. 1.
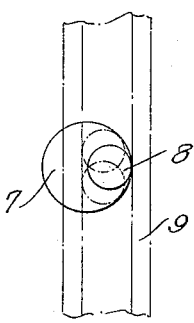
Fig. 6.
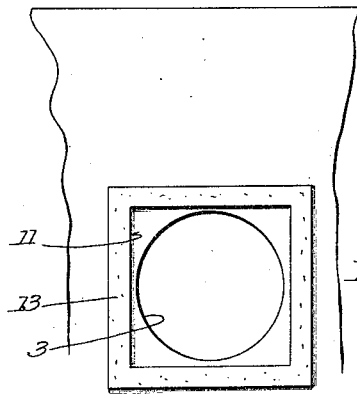
Fig. 7.
Preston Roots
INVENTOR
BY Victor J. Evans
ATTORNEY
WITNESS:

April 29, 1924.

P. ROOTS

DITCH GATE

Filed Sept. 6, 1921

Preston Roots.
INVENTOR

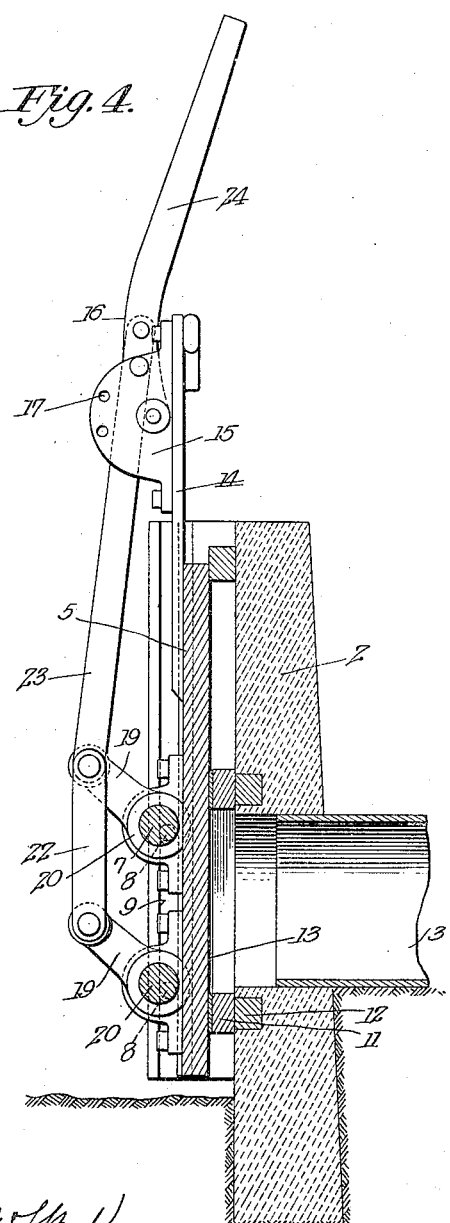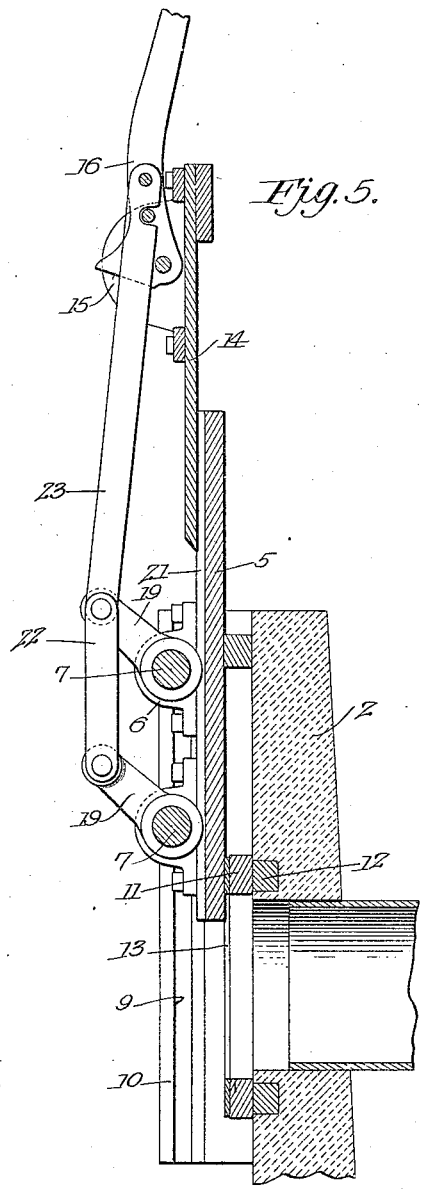

Patented Apr. 29, 1924.

1,492,482

UNITED STATES PATENT OFFICE.

PRESTON ROOTS, OF SAN BENITO, TEXAS.

DITCH GATE.

Application filed September 6, 1921. Serial No. 498,757.

*To all whom it may concern:*

Be it known that I, PRESTON ROOTS, a citizen of the United States, residing at San Benito, in the county of Cameron and State of Texas, have invented new and useful Improvements in Ditch Gates, of which the following is a specification.

This invention relates to a gate for irrigation systems, the general object of the invention being to provide a gate which will be leak proof when enclosed so as to prevent waste of water from the irrigation system.

Another object of the invention is to provide means for locking the gate in either its open or closed position so that it cannot be moved by an unauthorized person after being adjusted.

A further object of the invention is to provide means for moving the gate laterally towards and away from the opening in the wall so that it will make a tight fit with the wall around the opening when moved inwardly and will be free of said wall when moved outardly, thus permitting the gate to be raised and lowered very easily.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a diagrammatic plan view showing a portion of an irrigation system with my invention in use.

Figure 4 is a vertical section on line 4—4 of Figure 2.

Figure 5 is a vertical section with the gate in raised position.

Figures 6 and 7 are detail views.

Figure 2:
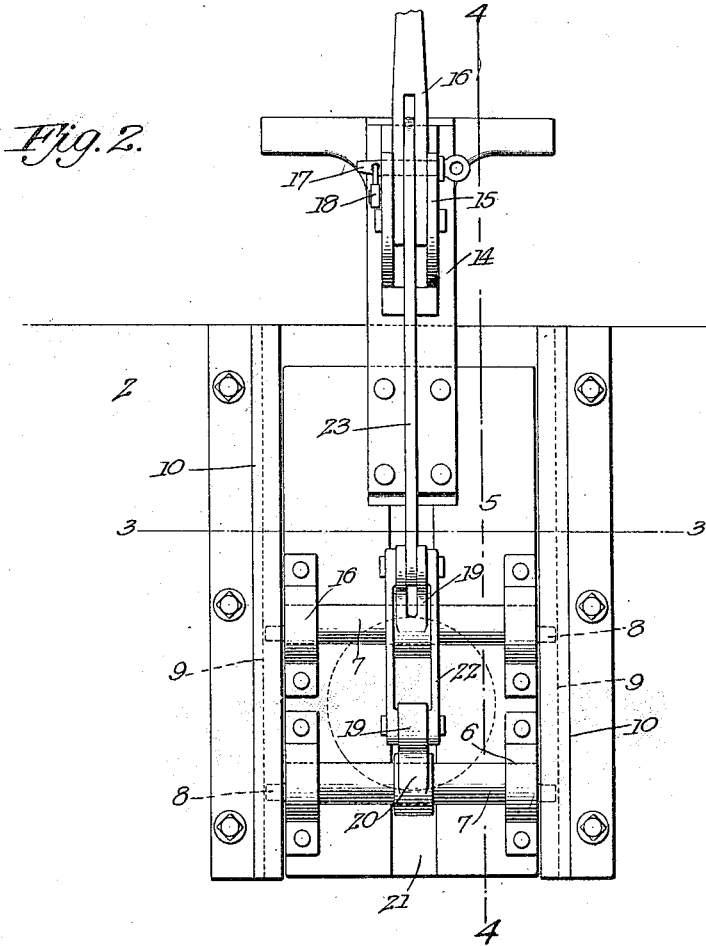
Figure 2 is an enlarged front view of part of a head wall with my gate thereon.
Figure 3:
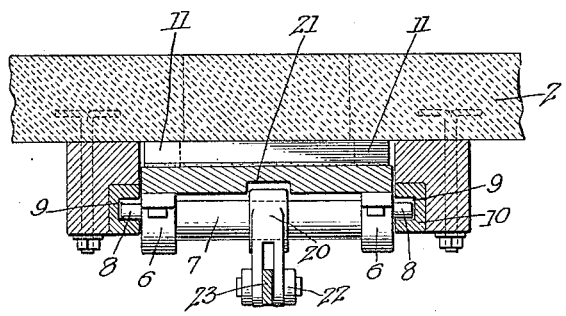
Figure 3 is a horizontal view on line 3—3 of Figure 2.

In these views 1 indicates a portion of one of the lateral ditches of the system, in one bank of which is located the head wall 2, preferably made of cement and which contains the pipe 3 for permitting some of the water to escape from the lateral ditch into the small ditch 4 which leads the water to the parts of the farm to be irrigated. My improved gate for controlling the flow of water through the pipe is shown at 5. This gate is provided upon its front face with the bearings 6 in which are rotatably mounted the shafts 7, the ends of the shafts being flush with the side edges of the gate but said ends are provided with eccentric projections 8 which engage the grooves 9 in the gate guides 10. These guides are formed of beams which are bolted to the head wall and strips 11, preferably of wood are placed around the opening or the end of the pipe in the wall to make a tight fit with the gate. These strips may be screwed to other strips 12 which are embedded in the wall and bolted thereto. A gasket 13 may be suitably secured to the outer faces of the strips 11 to insure a tight fit of the gate.

It will be seen that when the shafts 7 are rocked the position of the projections will be changed so that the gate will be moved inwardly or outwardly according to the direction of rotation of the shafts. Thus the gate can be forced against the strips to tightly close the opening or it can be moved in an opposite direction so that the gate can be raised and lowered easily as in this position the gate will not touch the strips on the gasket.

The gate is provided with an extension 14 at its upper end to which is secured the segments 15 between which the lever 16 is pivoted. Holes 17 are formed adjacent the curved edges of the segments for receiving a pin for holding the lever in adjusted position. One end of the pin is provided with a hole for receiving a lock 18 so that the pin can be locked in position. Each shaft 7 is provided with an arm 19 which is carried by a collar 20 on the shaft. The outer face of the gate is grooved, as at 21, to receive these collars. The two arms are connected together by the links 22 and the upper arm is connected with the lever by the link 23. This extension is also provided with a handle bar 24 for raising and lowering the gate.

It will thus be seen that when the gate is in lowered position and the lever is swung upwardly the shafts will be rocked to place the projections in such a position that the gate will be moved inwardly against the gasket on the strips to make a leak proof closure for the opening in the wall so that no water can escape through said opening.

Then when it is desired to raise the gate the lever is swung outwardly and downwardly so that the shafts are turned to cause their projections to force the gate outwardly and thus the gate can be moved without interference on the part of the strips around the opening.

This gate will prevent leakage and thus waste of water from the system and is very easily operated and can be manufactured to sell at low cost. It is simply necessary to make the gate large enough to cover the opening. It can also be easily substituted for a new one if it should get out of order. The lever can either be locked in its raised or lowered position so as to lock the gate in its adjusted position thus preventing an unauthorized person from tampering with the gate.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A water gate of the class described comprising a frame, guideways thereon, a gate slidably mounted between the guideways, a pair of shafts rotatably mounted on the gate and having eccentric projections on their ends engaging the guideways, an arm on each shaft, a link connecting the arms together, an extension on the upper end of the gate having a handle formed therewith, segments on the extension having holes therein, a lever pivoted between the segments, a link connecting the lever with the arm of the upper shaft, a pin adapted to be passed through any pair of holes in the segments and through the lever to hold the parts in adjusted position and a lock for holding the pin in place.

In testimony whereof I affix my signature.

PRESTON ROOTS.